Feb. 20, 1945. F. C. IGLEHART ET AL 2,370,039
BUS TRANSFER
Filed Dec. 31, 1941 3 Sheets-Sheet 1

WITNESSES:
Wm. B. Sellers
W. L. Young

INVENTORS
Ferdinand C. Iglehart and
Bruno L. Ullrich.
BY
Paul E. Friedemann
ATTORNEY Feb. 20, 1945.    F. C. IGLEHART ET AL    2,370,039
BUS TRANSFER
Filed Dec. 31, 1941    3 Sheets-Sheet 2

INVENTORS
Ferdinand C. Iglehart and
Bruno L. Ullrich.
BY
Paul E. Friedemann
ATTORNEY

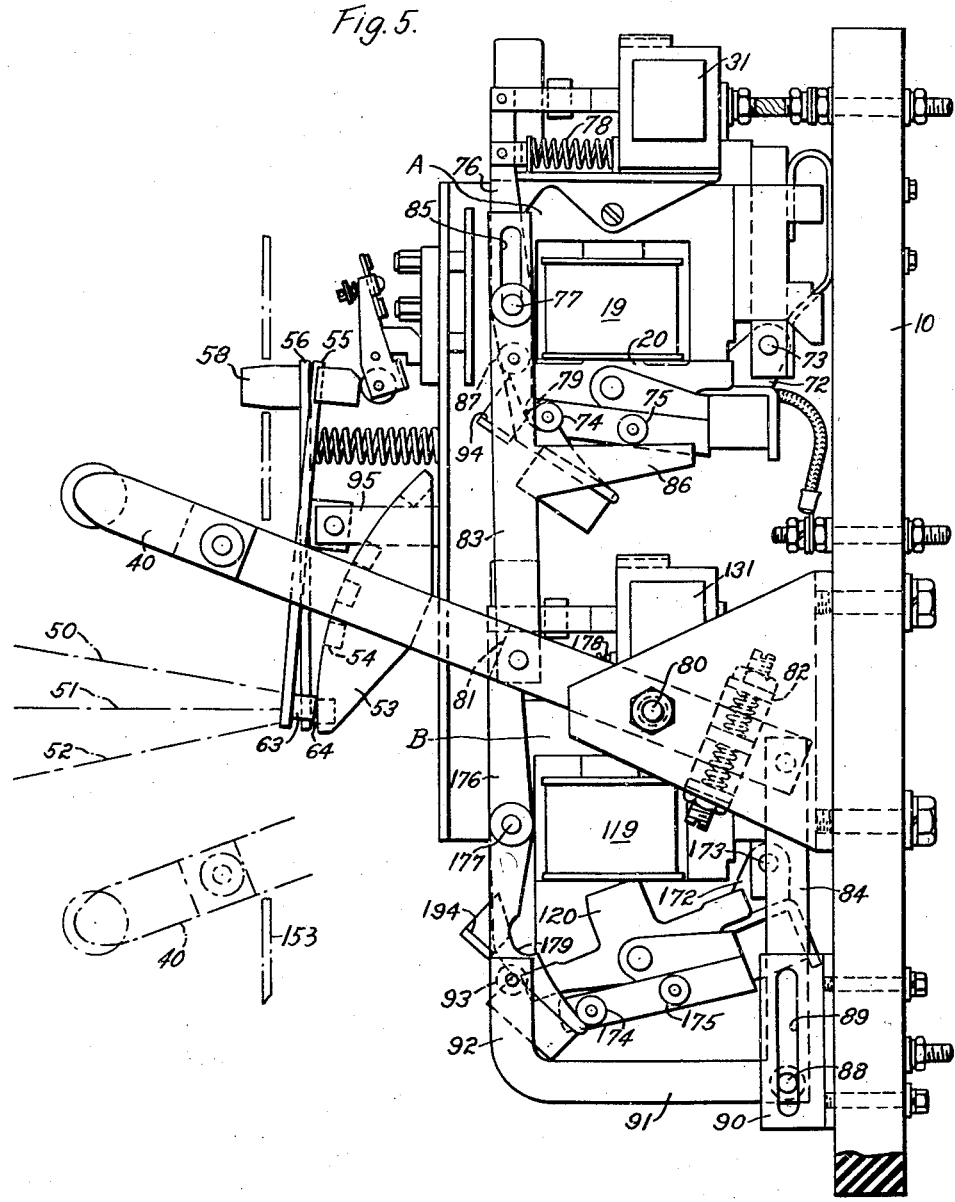

Patented Feb. 20, 1945

2,370,039

UNITED STATES PATENT OFFICE 2,370,039

BUS TRANSFER

Ferdinand C. Iglehart, Wilkinsburg, and Bruno L. Ullrich, Forest Hills, Pa., assignors to Westinghouse Electric & Manufacturing Company, East Pittsburgh, Pa., a corporation of Pennsylvania Application December 31, 1941, Serial No. 425,156

15 Claims. (Cl. 200—5)

This invention relates to a bus transfer and, more particularly, to an emergency operating means for a bus transfer having electrical means for operating the same.

Bus transfers are commonly used for changing the connections of an electric load, such as an electric motor, from one source of current to another. To accomplish this, there may be provided a pair of switches respectively connected to a set of bus bars and movable to closed position for selectively connecting the load to such bus bars, together with latches which are movable by appropriate means to locking position for holding the switch in closed position upon movement of the switch to such position. Since it would be obviously undesirable to connect the electric load to both sets of bus bars at the same time, interlocks are provided for preventing simultaneous closure of the switches.

In such bus transfers, the actuation of the switches and their associated latches is effected through power means such as electromagnets having suitable operating connections with the electric switches and associated latches. The control for the power operating means or electromagnets is commonly located at a point remote from the bus transfer itself. Occasions frequently arise due to failure of the electrical control, or for other reasons, when it is desirable to operate the bus transfer manually at its place of location. The provision of emergency operating means for the bus transfer is particularly desirable on equipment such as naval equipment, wherein the control station is likely to be put out of commission and emergency means for operating the bus transfer must be immediately available.

One of the principal objects of this invention accordingly is to provide, in a bus transfer having power means for operating the same, an emergency means for operating the transfer in case of failure of the power means.

A further object is to provide, in a bus transfer having power means for operating the same, an emergency operating means together with an interlock for rendering the power operating means inoperative upon operation of the emergency means.

A further object of this invention is to provide a bus transfer having power means for operating the same with an emergency operating means and an interlock which is actuable to render the power means inoperative and the emergency means operative.

A further object is to provide, in a bus transfer having a pair of switches and power means controlling the operation of such switches, an emergency mechanical means for operating the switches comprising a manually operable lever movable in opposite directions from a neutral position to switch operating positions for closing a selected one of the switches.

A further object is to provide an emergency bus transfer operating lever with interlock means effective to prevent operation of the lever during operation of the power means and actuable to render inoperative the power means and render operative the emergency lever.

Other objects and advantages of the invention will become apparent from the study of the following description and accompanying drawings, in which.

Figure 2:
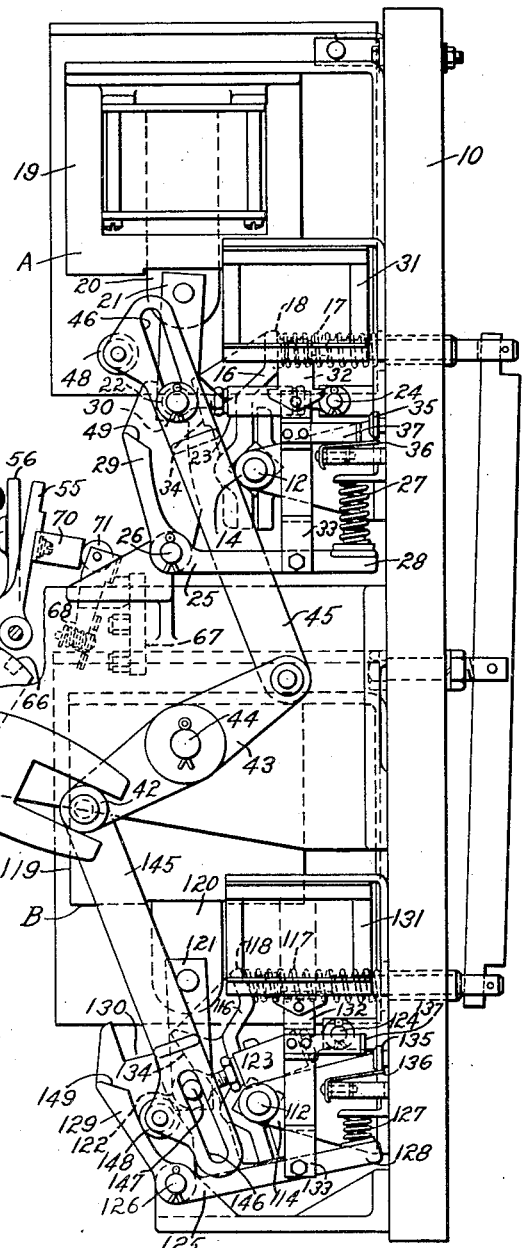
Fig. 2 is a side elevational view of the mechanism shown in Fig. 1.
Figure 4:
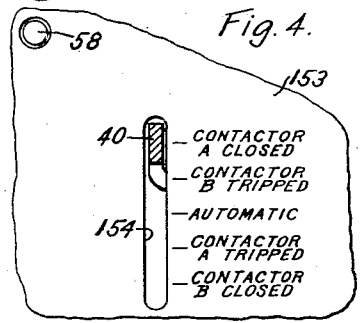

Fig. 4 is broken away view of a portion of the bus transfer casing through which the emergency operating handle extends, showing the manner in which the handle cooperates with indicia on the casing to indicate the condition of the switch contacts within the casing; and Fig. 5 is a side elevational view similar to Fig. 2 showing a modified arrangement of emergency operating means in connection with a different type of bus transfer.

Referring to the drawings, the numeral 10 designates a panel support having an upper switch unit indicated as a whole by the letter A and a lower switch unit indicated as a whole by the letter B mounted thereon. The switch units A and B are provided with suitable connections (not shown) to bus bars and electric load or motor leads and are operable upon selected closure thereof to connect the load leads to a set of bus bars in a manner well known in the art. The switch units A and B are identical in construction. In order to facilitate a comparison, the last two digits of the reference numerals applied in the drawings to switch B are identical with the reference numerals applied to corresponding parts of switch A. The reference numerals hereinafter mentioned in parentheses refer to elements of switch unit B.

Figure 1:
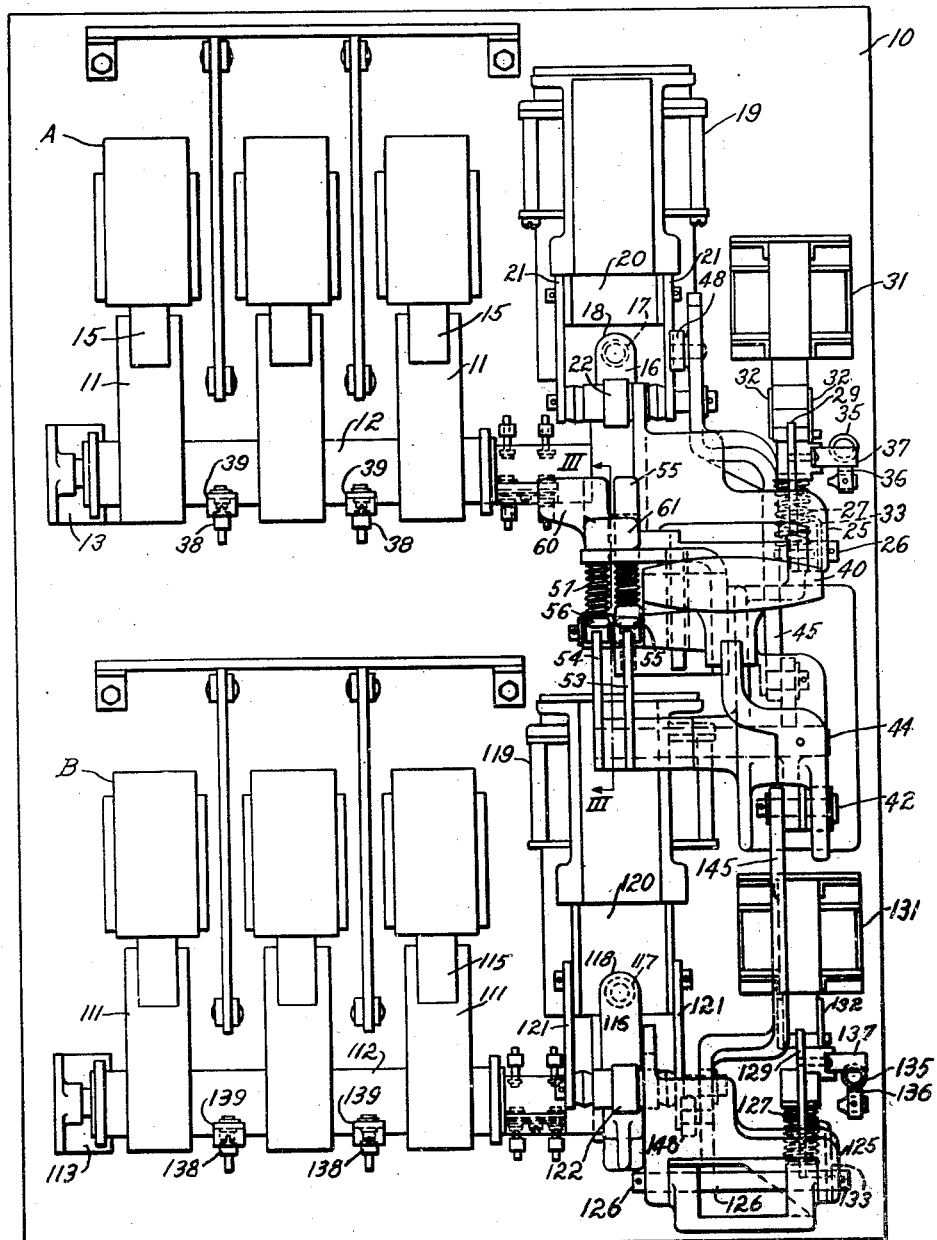
Figure 1 is a plan view of a bus transfer having emergency operating means constructed in accordance with the principles of this invention.

Referring to Fig. 1, the upper switch A, and likewise the lower switch B, is provided with a set of movable contacts 11 or 111 secured to an insulated shaft 12 or 112 rotatably mounted in bearings 13 and 14 or 113 and 114. According to the direction of rotation imparted to the shaft 12 or 112, the movable contacts will be moved either to or out of engagement with stationary contacts 15 or 115 to open or close the switch. The movable contacts 11 and 111 may be connected to the leads (not shown) of an electric load or motor and the stationary contacts 15 and 115 may be connected with a set of bus bars (not shown) in a manner well known in the art.

As best shown in Fig. 2, rotation is imparted to the shaft 12 or 112 by means of a bracket member 16 or 116 rigidly connected thereto. A spring 17 or 117 is engageable with the outer end 18 (118) of the bracket 16 (116) and provides a bias tending to move the bracket 16 (116) in a counterclockwise direction. In this manner, a bias is provided which tends to move the shaft 12 (112) and movable contacts 11 (111) out of engagement with the stationary contactors 15 (115). In order to move the contacts 11 (111) to their closed position against the bias of the spring 17 (117), a power-operated actuating means is provided consisting of an electromagnet 19 (119) with an armature 20 (120). The armature is pivotally connected to links 21 (121) which are in turn pivotally connected to and support a roller 22 (122). Upon movement being imparted to the armature 20 (120), the roller will be moved in an arcuate path controlled by the radius of a link 23 (123) which has one end pivotally connected to the roller 22 (122) and its other end pivotally connected at 24 (124) to the support 10 as best shown in Fig. 2.

A latch 25 (125) is mounted for pivotal movement about a pivot 26 (126) to and from positions locking its associated switch against movement. The latch is in the nature of a bell crank and a spring 27 (127) is provided for engagement with the outer end of one arm 28 (128) thereof. The spring 27 (127) provides a bias tending to move the bell crank 25 (125) in a clockwise direction to its locking position. The other arm 29 (129) of the bell crank is provided with a ledge 30 (130) for engagement with the roller 22 (122) to hold the bracket 16 (116) in a position for maintaining the shaft 12 (112) in a position with the movable contacts 11 (111) in engagement with the stationary contacts 15 (115).

In order to trip the latch 25 (125), an electromagnet 31 (131) having its armature 32 (132) connected to the arm 28 (128) by a link 33 (133) is provided. Upon energization of the electromagnet the armature and link will be drawn upwardly to move the latch in a counterclockwise direction against the bias of the spring 27 (127). Counterclockwise movement of the latch will be effective to disengage the ledge 30 (130) from the roller and permit the spring to move the bracket 16 (116) and associated contacts to the open position.

In the showing of Figs. 1 and 2, the contactor or switch unit A is shown in its closed position and the contactor or switch unit B is shown in its open position. The electromagnets 19 and 31 (119 and 131) control the operation of the units A and B through an interlocking circuit which has not been illustrated in the interest of simplicity and the construction of which is well known in the art.

Assuming that it is desired to open the unit A and close the unit B by the electromagnetic means, the electromagnet 31 of the unit A will be first energized to impart counterclockwise movement to its associated latch 25 to disengage roller 22 and permit opening of the unit A in the manner described above. Thereafter the electromagnet 119 associated with the lower switch unit B will be energized to impart upward movement to its associated roller 122. A camming surface 34 (134) is provided on each bracket 22 which is engaged by its associated roller 22 in upward movement thereof, such upward movement being effective to move the bracket 16 clockwise against the bias of its spring. The subsequent energization of the electromagnet 119 associated with the unit B is thereby effective to close the contacts of a switch unit B. After operation of the bracket 116 associated with the lower switch unit B to close the contacts of such unit, the latch 125 of the unit B will be moved by the bias of its spring 127 in a counterclockwise direction to latch the bracket 116 in its closed position.

To insure the retention of the magnets 19 and 119 in circuit only long enough to close their associated contacts, stationary and movable contacts 35, 36 and 125, 136, respectively, are included in the circuit of the electromagnets 19 and 119. As pointed out above, closure of one of the contactors results in clockwise movement of the latch 25 or 125 by the spring 27 or 127. Such clockwise movement of the latch results in downward movement of the link 33 (133) and upon movement of the latch to its locking position, an arm 37 (137) secured to the link engages with the movable contactor 36 (136) to disengage the contact 36 (136) from the contact 35 (135) to deenergize the coil 19 (119). The latch 25 (125) is thereafter effective to maintain the associated movable contacts 11 (111) in their closed position.

To insure the retention of the electromagnets 31 and 131 in the circuit only long enough to effect movement of the latches to unlocked position against the bias of the springs, stationary and movable contacts 38, 39 and 138, 139 (Fig. 1) are included in the coil circuit of the electromagnets 31 and 131, respectively. The movable contacts 39 (139) are mounted on the shaft 12 (112) for rotation therewith, and upon movement of the shaft to a position disengaging the contacts 11 (111) from the stationary contacts 15 (115), the movable contacts 39 (139) will be disengaged from the stationary contacts 38 (138) and the coil circuit of the electromagnet 31 (131) will be deenergized.

The energency operating system of Figs. 1 and 2 comprises a manually operable lever 40 mounted for pivotal movement about a pivot 41 from the switch operating position shown in solid lines to the switch operating position shown in dot-and-dash lines. The lever 40 is provided with a pin and slot connection 42 to a member 43 mounted for rotatable movement about a pivot 44, the pin and slot connection 42 enabling the transmission of pivotal movement of the lever 40 to the member 43. Opposite ends of the member 43 are respectively provided with actuating links 45 and 145 pivotally connected thereto. The outer end of each link is provided with an elongated slot 46 (146) through which a portion 47 or 147 of the shaft on which the roller 22 or 122 is mounted projects. Cooperation of the shaft portion 47 (147) with the slot 46 (146) provides a control for operation of the switch unit contactors. The outer end of each link rotatably supports a roller 48 (148) which is engageable with a camming surface 49 (149) on latch member 25 (125). Cooperation of the roller 48 (148) with the camming surface 49 (149) effects a control actuation of the latch 25 (125) in a manner to be described.

The solid and dot-and-dash lines showing the lever 40 in Fig. 2, indicate the two extreme operating positions adapted to be occupied for such lever. In moving from the position shown in solid lines to the position shown in dot-and-dash lines, the lever 40 moves through three other positions approximately indicated by the center lines 50, 51 and 52. The center line 51 indicates the position which will be occupied by the operating lever 40 when in its neutral position and the center lines 50 and 52 indicate so-called tripping positions to be occupied by the lever 40.

With the lever 40 in the position shown in full lines, the switch unit A is in its closed position with its associated latch 25 in locked position and the switch unit B is in its open position with the latch 125 in its unlocked position.

Assuming that it is desired to open the switch unit A and close the switch unit B, the lever 40 is moved from the position shown in solid lines to the position shown in dot-and-dash lines. During this movement, the lever 40 passes through the positions indicated by the center lines 50, 51 and 52. As the lever 40 moves through the tripping position indicated by the center line 50 and its neutral position as indicated by the center line 51, no change takes place in the relative positions of the switch and latch parts shown in Fig. 2. The only change which takes place is a relative change in the position of the actuating links 45 and 145 and their slots 46 and 146 relative to the roller parts 47 and 147. As the lever 40 moves from its neutral position to the tripping position indicated by the center line 52, the camming roller 48 on the upper link 45 moves into engagement with the camming surface 49 and cams the latch 25 in a counterclockwise direction against the action of the spring 27 to trip the switch unit A and cause its bias as provided by the spring 17 to become effective for moving the switch unit A to open position. At about the time the switch unit A is tripped to open position, the lower end of the slot in the lower link 145 will have moved into engagement with the shaft portion 147. Thereafter, movement of the lever 40 from the tripping position indicated by the center line 52 to its position as indicated in dot-and-dash lines will be effective to impart upward movement to the roller 122 of the switch unit B. Such upward movement of the roller will cam the member 116 in a clockwise direction against the bias of its spring 117 to close the movable contacts of the switch unit B.

It will be understood that the reverse of the above described movements will take place upon movement of the lever 40 from the position shown in dot-and-dash lines to the position shown in full lines to trip the switch B and close the switch A. In such case, the switch B will not trip until the lever 40 moves into the tripping position as indicated by the center line 50.

The manner in which the lever 40 cooperates with the contactor B to indicate its various positions is best shown in Fig. 4. In this showing, the housing cover plate is indicated by the numeral 153 and is provided with an opening 154 through which the lever 40 projects. Indicia in the nature of descriptive matter is marked on the surface of the cover plate 153 to indicate, by cooperation with the handle 40, the condition of the mechanism underneath the cover plate 153. In this manner it is merely necessary for an operator to glance at the position of the lever 40 to know immediately which of the switch units have been closed or tripped.

An interlock system is provided for preventing simultaneous operation of the automatic or power operating means and the emergency mechanical means. The interlock system comprises a pair of latch plates 53 and 54 keyed to the pivot shaft 41 so as to be rotatable with the handle 40. A pair of latching members 55 and 56 are mounted for pivotal movement and cooperate with the latch plates 53 and 54 in a manner to be described. Springs 57 provide a bias tending to move the latches 55 and 56 in a counterclockwise direction. A latch operating push button 58 projecting through the opening in the cover plate 153 is operable through an actuating member 59 to impart movement to the latch 56. The actuating member 59 engages with a member 60 on the latch 56 for imparting pivotal movement to such latch in a clockwise direction against the bias of its spring 57. The latch 56 is provided with a part 61 projecting outwardly over the latch 55, as viewed in Fig. 1, whereby inward movement imparted to the latch 56 will be effective to impart inward movement to the latch 55.

Figure 3:
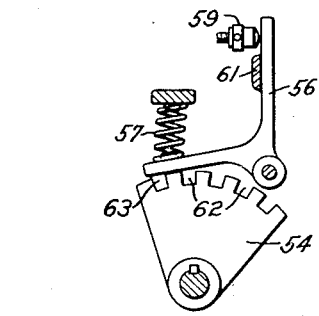
Fig. 3 is a detailed sectional view taken substantially on the line III—III of Fig. 1.

As best shown in Fig. 3, the latch plate 54 is provided with five notches 62 corresponding to the five different positions to be occupied by the lever 43. The latch 56 is provided with a detent 63 movable into engagement with one of the notches 62 in any position to which the lever 40 is moved.

The latch plate 53 differs from the latch plate 54 in that it is provided with only a single notch 64. The notch 64 is adapted to receive a detent 65 carried by the latch 55 when the lever 40 occupies its neutral position, as indicated by the center line 51 in Fig. 2. When the lever 40 is out of its neutral position, the detent 65 rides on the arcuate surface 66 of the latch plate 53, maintaining the latch 55 in the position shown in Fig. 2.

The circuit for the power operating means comprising the electromagnets 19, 31 and 119, 131 is provided with a control switch 67 having a pivotally mounted movable contact member 68. The movable contact member 68 is provided with a spring (not shown) for biasing such contact to its closed position.

The latch 55 has an actuating member 70 projecting inwardly therefrom for engagement with a roller 71 carried by the pivotally movable contact 68 when the latch 55 is in the position shown in Fig. 2. The member 70 is effective to maintain the movable contact 68 in its open position against the action of the spring 69, thereby interrupting the control circuit for the power means and rendering such power means inoperative.

Assuming the lever 40 to be in its neutral position as indicated by the center line 51, it will be first necessary to move the push button 58 inwardly before the emergency operating lever 40 may be actuated. Movement of the push button 58 inwardly moves both of the latches 55 and 56 to their unlocked position, releasing the handle 40 for movement and at the same time actuating the contact 68 to render the power means comprising the electromagnets 19, 119 and 31, 131 inoperative. Thereafter, upon movement of the handle 40 to any of its operating positions, the detent 65 riding on the surface 66 will be effective to lock out and prevent operation of the power means. Moreover, the release of the push button 58 after movement of the handle 40 to any of its operating positions will permit the latch 56 to move under its spring bias in a counterclockwise direction to a position with the detent 63 in one of the notches 62, thus locking the handle 40 against movement from such position. Upon return of the handle 40 to its neutral position both of the detents 63 and 65 will move into engagement with notches 62 and 64 to lock the handle 40 against movement and the movable contact 68 will be closed by its spring bias to render the automatic or electromagnetic power means operative.

In Fig. 5, there is shown a modification adapting the principles of this invention to bus transfers employing a different type of contactor mechanism. In the showing of Fig. 1, it will be recalled that the movable contacts 11 are rotatable to and from their closed position. The upper and lower switch units A and B of Fig. 5 are different in that the movable contacts are actuable by a so-called clapper type armature. However, the number of elements and the functions are substantially the same and like numerals have been employed to designate elements functioning in the same manner as the elements designated by such numerals in the showing of Figs. 1 through 4. In view of the foregoing, it is believed sufficient to point out that the armature 20 (120) is connected to a bracket 72 (172) mounted for pivotal movement about a pivot 73 (173). The bracket carries the movable contacts (not shown) by which the closing and opening of the switch units A and B are controlled. In addition, the bracket carries rollers 74 (174) and 75 (175) for a purpose to be described. The latch members 76 and 176 in Fig. 5 function similarly to the latches 25 and 125 of Fig. 2 and are mounted for pivotal movement about pivots 77 and 177, respectively. Springs 78 (178) are provided for biasing the latches to their closed position. The movable contact carrying bracket 72 (172) has a gravity bias to its open position, although it will be apparent that a spring bias could also be provided.

In the showing of Fig. 5, the switch unit A is illustrated as being in its closed position. In automatic operation to open the switch A and close the switch B in the showing of Fig. 5, the electromagnet 31 is first operated to trip the latch 76 to move the notch 79 from engagement with the roller 74 to permit the bias of the bracket 72 to move the switch unit A to its open position. Thereafter, energization of electromagnet 119 will actuate the bracket 172 to close the switch unit B. Upon movement of the bracket 172 to its closed position, the latch 176 will be moved by its bias to latching position with the notch 179 positioned underneath the roller 174, preventing movement of the bracket 172 to its open position.

In this showing, the lever 40 is mounted for pivotal movement about a shaft 80 and pivotal movement of the lever 40 to its various operating positions is effective to impart similar movement to a lever 81 carried by the shaft 80 through a resilient lost motion connection indicated as a whole by the numeral 82. The lever 81 has one end thereof pivotally connected to an operating member 83 and has its other end pivotally connected to a J-shaped operating member 84. The operating member 83 is adapted to operate the switch unit A and the operating member 84 is adapted to operate the switch unit B.

The member 83 is provided with a slot 85 engageable with the pivot bushing 77 for guiding the member 83 in its vertical movement. The member 83, in addition, is provided with an integral inwardly projecting arm 86 adapted to engage with the upper roller 75 for moving the bracket 72 of the upper switch unit A to its closed position. The operating member 83 also carries a roller 87 for operating the latch 76 in a manner to be described.

The J-shaped operating member 84 is guided in its vertical movement by a pin 88 riding in a slot 89 formed in a stationary member 90. The base portion 91 of the J-shaped lever 84 is adapted to engage with the roller 175 in moving the lower switch unit B to its closed position. In addition, the upwardly projecting arm 92 of the member 84 carries a latch operating roller 93.

The operation of the switch units A and B in Fig. 5 as the lever 40 moves through its operating positions is the same as described in connection with the showings of Figs. 1 and 2. Accordingly, the operation of the modification of Fig. 5 will be sufficiently apparent from a description of the motion taking place in movement of the latch lever 40 from the position shown in full lines to the position shown in dot-and-dash lines. As the lever 40 is moved from the position shown in full lines to its neutral position as indicated by the center line 51, no action takes place other than a lowering of the member 86 and a lifting of the lever 84. As the lever 40 thereafter moves to the tripping position, as indicated by the center line 52, the roller 87 will engage the camming member 94 secured to the upper latch 76 to move the notch 79 from underneath the latch roller 74 to permit movement of the switch unit A to its open position. Continued movement of the lever 40 to its position as indicated in dot-and-dash lines, will engage the member 91 with the roller 175 and effect movement of the roller 175 and its supporting bracket 172 in an upward direction to close the switch unit B.

The interlocking control of the automatic and emergency operating means of Fig. 5 is essentially the same as that shown in Fig. 2. However, it will be noted that the latch plates 53 and 54 are carried directly by the handle 40 and moved therewith about the pivot shaft 80. The latching members 55 and 56 carrying the detents 63 and 64 are mounted on a support 95 for pivotal movement with respect thereto. The interlocking parts operable by the push button 58 and cooperating with the latch plates 53 and 54 function in the same manner as described in the embodiment shown in Figs. 1 and 2.

We claim as our invention:

1. In combination, a control having a pair of electric switches respectively movable between open and closed positions and having a bias for movement toward open position, a latch associated with each of said switches for locking its associated switch in closed position and having a bias for movement toward locking position, and means for operating said switches comprising a common control member, separate links connecting said member to each of said switches, each of said links being operable upon movement in one direction to move one of said switches against its bias to closed position and upon movement in an opposite direction to move the latch associated with such switch against its bias to unlocking position to release such switch for movement by its bias to open position, said links being operable upon movement of said member in one direction to first unlatch one of said switches and thereafter close the other of said switches, and upon movement in an opposite direction to first unlatch said other switch and thereafter close said one switch.

2. The combination of claim 1 wherein said operating member is movable to switch operating positions from an intermediate neutral position together with power-operated means for operating said latches and switches, a control means for rendering said power-operated means inoperative, and an interlock disposed between said control means and said operating member so as to be effective when said member is in said neutral position whereby said power-operated means are rendered operative, and said interlock being actuable to release said member for movement from its neutral position and to cause said control means to render said power-operated means inoperative.

3. In combination, a control having a pair of electric switches respectively movable between open and closed positions and having a bias to one of said positions, a latch associated with each of said switches movable into locking engagement with its associated switch upon movement of such switch to its other position, power-operated actuating means operable to trip one of said latches to release its associated switch for movement under its bias to said one position and to move the other of said switches against its bias to its other position in such manner that only one of said switches is closed at any given time, and emergency means for operating said switches and latches independently of said actuating means comprising a single manually operable control member, and means connecting said control member with each of said switches and their associated latches effective upon movement of said control member in one direction to trip one of said latches and move one of said switches against its bias, and upon movement in an opposite direction to trip the other of said latches and to move the other of said switches against its bias, in such manner that only one of said switches is closed at any given time.

4. In combination, a control having a pair of electric switches, and power-operated means for operating said switches, an emergency operating member, means interconnecting said member with both of said switches to render said member operable to selectively close one of said switches independently of said power means, and locking means controlled by said member and connected with said power-operated means for rendering the latter ineffective in dependence upon said member being in operative condition.

5. In combination, a control having a pair of electric switches, and power-operated means for operating said switches, control means for rendering said power means inoperative, and an emergency operating member for operating said switches independently of said power-operated means, said control means being interconnected with said member for rendering said power means inoperative upon operation of said member.

6. In combination, a control having a pair of electric switches, and power-operated means for operating said switches, control means for rendering said power means inoperative, an emergency operating member, means interconnecting said member with both of said switches to render said member operable to selectively close one of said switches independently of said power-operated means, and means interconnecting said member with said control means for operating said control means upon operation of said member to close one of said switches.

7. In combination, a control having a pair of electric switches and automatic magnetic actuating means connected to said switches for operating the same, a common movable operating member, and means connecting said member with both of said switches for operating said switches independently of said magnetic means, said connecting means being effective upon movement of said member in one direction to operate one of said switches, and upon movement of said member in an opposite direction to operate the other of said switches, and locking means controlled by said member and connected with said magnetic actuating means for rendering the latter ineffective in dependence upon said member being in operative position.

8. In combination, a control having a pair of electric switches and electrically operated actuating means connected to said switches for operating said switches automatically, a control switch for rendering said actuating means inoperative, an operating member, means connecting said member with both of said switches to render said member operable to selectively close one of said switches independently of said means, and means interlocking said control switch with said member for maintaining said actuating means inoperative during operation of said member.

9. In combination, a control having a pair of electric switches, and power-operated actuating means for operating said switches, control means for rendering said actuating means inoperative, a common operating member having connections with both of said switches and operative upon movement in opposite directions from a given position to selectively operate either of said switches independently of said power means, and latch means for locking said member in said given position, said latch means being effective upon operation thereof to release said member to operate said control means to render said actuating means inoperative.

10. In combination, a control having a pair of electric switches, and power-operated actuating means for operating said switches, control means for rendering said actuating means inoperative, a common operating member having connections with both of said switches and operative independently of said actuating means upon movement in opposite directions from a given position to selectively operate either of said switches, a latch plate secured to and movable with said member, a latch movable into locking engagement with said plate for locking said member in said given position, and means operative upon movement of said latch out of locking engagement to operate said control means to render said actuating means inoperative.

11. In combination, a control having a pair of electric switches, a latch for each of said switches movable to locking position upon movement of its associated switch to closed position, an emergency operating member, means interconnecting said member with said switches and latches for rendering said member operative to selectively operate one of said switches and its associated latch independently of said devices, and electric actuating devices associated with said latches respectively to operate said switches automatically, and electric contact means controlled by said member and connected with said electric actuating devices for rendering the latter ineffective when said member is in operative condition.

12. In combination, a control having a pair of electric switches, a latch for each of said switches movable to locking position upon movement of its associated switch to closed position, and power-operated actuating means for operating said latches and switches, control means for rendering said actuating means inoperative, an operating member operatively related to said switches and latches and effective independently of said actuating means for operating a selected one of said switches and its associated latch, and means operable to actuate said control means upon movement of said member to close one of said switches.

13. In combination, a control having a pair of electric switches, a latch for each of said switches movable to locking position upon movement of its associated switch to closed position, and power-operated actuating means for operating said latches and switches, control means for rendering said actuating means inoperative, an operating member having connections with said switches and latches operative independently of said actuating means upon movement in opposite directions from a given position to selectively operate either of said switches, and latch means for locking said member in said given position, said latch means being effective upon operation thereof to release said member for operating said control means to render said actuating means inoperative.

14. In combination, a control having a pair of electric switches, and power-operated actuating means for operating said switches, a common control member having connections with said switches for operating the same independently of said actuating means, said control member having a neutral position and being movable therefrom in opposite directions to operating positions, and latching control means operative when said member is in its neutral position to lock said member against movement, said control means being connected with said actuating means so as to render said actuating means operative when said member is in its neutral position and inoperative when said member is moved out of neutral position.

15. In combination, an electric switch movable between open and closed positions and having a bias toward one of said positions, a latching member movable between positions locking and unlocking said switch and having a bias toward one of said positions, power-operated actuating means for moving said latch and switch to their other positions, a control for rendering said actuating means inoperative, an operating member movable to and from a neutral position for moving said latch and switch to their other positions independently of said actuating means, and means controlled by said member for rendering said control operative when said operating member is out of its neutral position.

FERDINAND C. IGLEHART.
BRUNO L. ULLRICH.